United States Patent Office 3,410,909
Patented Nov. 12, 1968

3,410,909
CATALYTIC SYNTHESIS OF KETONES FROM ALDEHYDES
Jean C. Fleischer, Jefferson Wayne Reynolds, and Howard S. Young, Kingsport, Tenn., assignors to Eastman Kodak Company, Rochester, N.Y., a corporation of New Jersey
No Drawing. Filed June 27, 1966, Ser. No. 560,794
6 Claims. (Cl. 260—593)

ABSTRACT OF THE DISCLOSURE

Process for preparing unsymmetrical ketones comprising passing at an elevated temperature at least two different aldehydes over a catalyst comprising oxidized lithium supported on activate alumina.

---

This invention relates to catalytic chemical reactions. More particularly, this invention is concerned with novel catalytic methods of producing ketones, and novel catalysts useful in such processes.

The conversion of aldehydes to ketones by catalytic means has been reported in the literature. See U.S. Patents 1,925,311 and 1,949,412. However, these patents and other prior art on the subject do not disclose the use of an oxidized form of lithium for catalyzing the process.

According to the present invention, it has been discovered that aliphatic aldehydes can be converted to aliphatic ketones by contacting the aldehyde or mixtures thereof with an oxidized form of lithium supported on alumina in the presence of water vapor at an elevated temperature suitable for effecting the reaction. The process can be conducted as a batch process or a continuous process.

More specifically, the present invention provides the process of reacting a compound of the formula

with a compound of the formula

by bringing said compounds together in the presence of steam and in contact with a catalyst comprising an alumina-supported oxidized form of lithium, wherein R and $R_1$ are the same or different straight or branched chain lower alkyls such as methyl, ethyl, propyl, isopropyl and butyl.

When R and $R_1$ represent the same lower alkyl group the process leads to the formation of symmetrical ketones. However, when two different aldehydes are used as reactants, i.e., when R and $R_1$ are different lower alkyls, the resulting ketone will be unsymmetrical although there can also be some symmetrical ketones formed as by-products.

Among the aliphatic aldehydes which can be used as reactants in the process are acetaldehyde, propionaldehyde, isobutyraldehyde and butyraldehyde, or a mixture of two or more of these or other lower aliphatic aldehydes, i.e., aldehydes containing up to eight carbons in a noncyclic saturated aliphatic chain.

This invention also provides and utilizes catalysts which are particularly useful in effecting the described process. These special catalysts comprise lithium in an oxidized form supported on an activated alumina. Alumina alone, free of lithium in an oxidized form, is a poor catalyst for the reaction. The alumina support can be any of its active forms, including the gamma, eta, chi, kappa and theta forms.

In order to effect the reaction it appears necessary that the lithium be present on the alumina support in an oxidized form. Also, it is reasonable to expect that the lithium is converted from an oxidized form to intermediate salts of the reactants used or a salt of the alumina support. Lithium oxide, nevertheless, seems to be a main form through which the catalytic activity of lithium is routed or mediated. Lithium oxide thus can be used as such although it is suitable to employ compounds of lithium which are convertible to the oxide, including lithium carbonate, lithium nitrate, lithium acetate, lithium oxalate and lithium isobutyrate. When desired, mixtures of such compounds can also be used in forming the catalyst.

The alumina supported catalyst can be readily formed by conventional procedures. In one procedure, a water soluble lithium salt can be dissolved in water and the aqueous solution poured over activated alumina particles. By calcining prior to use in the reaction, the salt is converted to lithium oxide supported on the alumina. However, instead of such a prior calcining it is sometimes feasible to effect the conversion from salt to oxide during the reaction. Patricularly useful supported catalysts can contain about 1% to 25% by weight of lithium calculated as the oxide.

Conversion of the aldehydes to the desired ketones using the described lithium catalysts can be readily achieved at an elevated temperature which effects the reaction, which generally will be from about 400° C. to 650° C.

The reaction is readily effected at atmospheric pressure. However, increased or decreased pressures such as of about 0.1 to 5 atmospheres can also be used satisfactorily.

The reaction is conveniently effected by vaporizing the aldehyde, then bringing it into contact with the catalyst and maintaining contact for sufficient time to effect reaction without forming excessive amounts of undesirable by-products. Usually a contact time of about 0.1 to .20 sec. is sufficient. The contact time in seconds is the milliliters of catalyst divided by the rate of flow of gaseous feed in milliliters per second at reaction conditions. The catalyst can be positioned in a suitable tube of glass or inert metal in a loosely packed state which permits the aldehyde vapor and steam to pass through.

For optimum yields of the desired ketones, water vapor, i.e., steam, should be present with the aldehyde at the time of reaction in a molar ratio of about 1 part aldehyde to about 1 to 25 parts steam.

Among the ketones produced by the described process from the appropriate aldehydes are acetone, diethyle ketone, methyl ethyl ketone, methyl propyl ketone, methyl isopropyl ketone and diisopropyl ketone. However, besides the desired ketones, some amounts of acids corresponding to the aldehyde fed are made as by-products of the reaction. Thus, isobutyric acid is produced from isobutyraldehyde and steam, and acetic acid is produced from acetaldehyde and steam. These by-products can be readily separated from the ketones by conventional methods, such as distillation.

The ketones produced by this invention are well known compounds which have valuable uses as solvents for materials such as rubbers, elastomers, polyvinyl acetate, waxes, tars and other materials. They are also intermediates in making other products.

The following examples are presented to illustrate the invention. In these examples, yields are given in mole-percent.

EXAMPLE 1

A 321 g. amount of ⅛ in. gamma alumina tablets with a surface area of 80–100 sq. meters per gram and a pore volume of 0.28–0.33 cc./g. was placed in a porcelain evaporating dish. A 121.5 g. quantity of lithium acetate 2·H₂O was dissolved in 150 ml. of distilled water by heating on a steam bath, and this solution was poured onto the alumina with rapid stirring. The material was heated on a steam bath with frequent stirring for a period of 3.5 hrs. to give dry-appearing tablets containing 5% Li₂O calculated on a dry basis. A volume of 25 ml. of 8-20 mesh material was obtained by crushing and screening some of the ⅛ in. tablets. The 25 ml. of catalyst was placed in a tubular glass reactor having an inside diameter of 16 mm. and a 6 mm. outer diameter thermowell located concentrically inside of it. The catalyst bed was about 5.5 in. long. The reactor was heated 1 hr. at 450° C. while passing nitrogen through it, and then isobutyraldehyde and steam were fed through at the same temperature. The isobutyraldehyde was fed at 12 g./hr. and the steam at 6 g./hr. The following results were obtained for 2 hr. runs:

| Run | DIPK * Produced, g. | Percent Yield of DIPK * |
| --- | --- | --- |
| 1 | 4.9 | 50.0 |
| 2 | 4.4 | 56.9 |
| 3 | 3.6 | 77.1 |
| 4 | 3.0 | 49.5 |

* DIPK—diisopropyl ketone.

EXAMPLE 2

A catalyst containing about 5% Li₂O was prepared using 321 g. of the alumina of example 1. 2.2 g. of lithium nitrate was dissolved in 120 ml. of distilled water and poured onto the alumina in a porcelain evaporating dish with rapid stirring. The mixture was allowed to soak 2 hrs. with occasional stirring. The material was then heated on a hot plate while stirring constantly to give dry-appearing tablets. The tablets were calcined at 450° C. for 1 hr. in a muffle furnace. A quantity of 25 ml. of 8-20 mesh material was prepared and placed in a reactor tube as in Example 1. A mixture of acetaldehyde and isobutyraldehyde in the presence of staema at 450° C. was used in the catalytic synthesis of methyl isopropyl ketone (MIPK), acetone and diisopropyl ketone (DIPK). With feeds of 0.167 g. moles of the aldehyde mixture (1 gram mole of acetaldehyde plus 2 gram moles of isobutyraldehyde) and 6 g. of steam per hour, the following results were obtained in three successive two-hour runs:

| Run | Ketone Produced, g. | | | Percent Yield Based on Acetaldehyde | | Percent Yield Based on Isobutyraldehyde | |
| --- | --- | --- | --- | --- | --- | --- | --- |
|  | Acetone | MIPK | DIPK | Acetone | MIPK | MIPK | DIPK |
| 1 | 0.2 | 4.2 | 2.4 | 6.1 | 43.5 | 27.4 | 23.9 |
| 2 | 0.1 | 4.0 | 2.0 | 4.2 | 42.0 | 27.6 | 20.4 |
| 3 | 9.2 | 3.8 | 1.8 | 5.1 | 40.3 | 26.4 | 19.0 |

EXAMPLE 3

A catalyst containing about 5% Li₂O (calculated) was prepared from 1000 g. of the same alumina used in Example 1 and 243 g. of lithium nitrate. The lithium nitrate was dissolved in 250 ml. of distilled water and used in the impregnation and drying steps as described in Example 2. Next, the material was placed in a 2 in. outer diameter glass tube reactor. The tube had a 35 mm. inner diameter and a 9 mm. outer diameter thermowell located concentrically therein. The tube held 200 ml. of catalyst in a bed 9 in. long. The reactor was heated 4 hrs. at 500° C. while passing nitrogen through it. A volume of 200 ml. of the catalyst was tested in two successive 5 hr. runs in the synthesis of diisopropyl ketone (DIPK) from isobutyraldehyde and steam at 460° C. Isobutyric acid was produced in the process. The following table gives the feed rates and the results obtained:

| Run | Feed, g. | | Gram Produced | | Percent Yield | |
| --- | --- | --- | --- | --- | --- | --- |
|  | Aldehyde | Steam | DIPK | Acid | DIPK | Acid |
| 1 | 377 | 1,786 | 12.3 | 36.6 | 25.4 | 48.2 |
| 2 | 462 | 240 | 20.2 | 30.7 | 25.5 | 25.2 |

EXAMPLE 4

A quantity of 25 ml. of 8-20 mesh Harshaw grade Al-0104 alumina (containing no Li₂O) was tested in the synthesis of DIPK from isobutyraldehyde and steam as described in Example 1. In four successive 2 hr. runs at 450° C. the following results were obtained:

| Run | Grams DIPK | Percent Yield DIPK |
| --- | --- | --- |
| 1 | 0.3 | 3.0 |
| 2 | 0.7 | 12.8 |
| 3 | 0.5 | 7.6 |
| 4 | 0.6 | 8.5 |

The products were not analyzed for isobutyric acid.

In similar tests using Alcoa grade F-1 alumina, yields of DIPK from 13.5% to 16.9% were obtained. Thus, these results show that alumina alone is not a good catalyst for this synthesis.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A process for preparing a compound of the formular

in the presence of water vapor and at a temperature of about 400° C. to about 650° C. with a catalyst composition comprising about 1% to about 25% by weight of lithium oxide supported on activated alumina.

2. The process of claim 1 in which a contact time of about 0.1 to 20 seconds is used.

3. The process of claim 1 in which the alumina is in the gamma, eta, chi, kappa or theta form or mixtures thereof.

4. The process of claim 1 in which the molar ratio of water vapor to aldehyde content is from about 1:1 to 25:1.

wherein R and R₁ are different lower alkyl groups which comprises reacting a compound of the formular

with a compound of the formular

5. Process of claim 1 wherein said aldehydes include isobutyraldehyde and acetaldehyde.

6. Process of claim 1 wherein said catalyst comprises lithium oxide or a compound which is converted to lithium oxide at the elevated temperatures of the process supported on activated alumina.

References Cited

UNITED STATES PATENTS

| | | | |
|---|---|---|---|
| 1,755,193 | 4/1930 | Schlecht | 260—593 |
| 1,892,742 | 1/1933 | Walter et. al. | 260—595 |
| 2,474,440 | 6/1949 | Smith et al. | 252—463 |
| 2,664,446 | 12/1953 | Charlton et al. | 252—463 |
| 3,163,612 | 12/1964 | Meisinger et al. | 252—463 |

FOREIGN PATENTS 512,123   4/1955   Canada.

OTHER REFERENCES

Sabatier; catalysis in organic chemistry, pp. 839 to 845. (1923).

LEON ZITVER, *Primary Examiner.*

M. JACOB, *Assistant Examiner.*

UNITED STATES PATENT OFFICE
CERTIFICATE OF CORRECTION

Patent No. 3,410,909              November 12, 1968

Jean C. Fleischer et al.

It is certified that error appears in the above identified patent and that said Letters Patent are hereby corrected as shown below:

Column 2, line 50, "diethyle" should read -- diethyl --. Column 3, line 33, "example 1. 2.2" should read -- Example 1.82.2 --; line 43, "staema" should read -- steam --. Column 4, line 34, beginning with "1. A process" cancel all to and including "activated alumina." in line 39, same column 4, and insert:

1. A process for preparing a compound of the formula

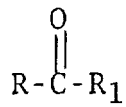

wherein R and $R_1$ are different lower alkyl groups which comprises reacting a compound of the formula

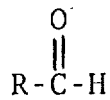

with a compound of the formula

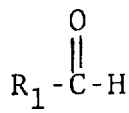

in the presence of water vapor and at a temperature of about 400°C. to about 650°C. with a catalyst composition comprising about 1% to about 25% by weight of lithium oxide supported on activated alumina.

same column 4, line 48, beginning with 3,410,909

(2)

$$R-\overset{\overset{\displaystyle O}{\|}}{C}-R_1$$

cancel all to and including $$R_1-\overset{\overset{\displaystyle O}{\|}}{C}-H$$

in line 70, same column 4.

Signed and sealed this 10th day of March 1970.

(SEAL)
Attest:

EDWARD M. FLETCHER, JR.
Attesting Officer

WILLIAM E. SCHUYLER, JR.
Commissioner of Patents